(12) United States Patent
Iwase et al.

(10) Patent No.: US 6,270,263 B1
(45) Date of Patent: Aug. 7, 2001

(54) OPTICAL MODULE

(75) Inventors: Masayuki Iwase; Hajime Mori; Takashi Shigematsu, all of Ichihara (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/125,957
(22) PCT Filed: Jan. 14, 1998
(86) PCT No.: PCT/JP98/00119
  § 371 Date: Aug. 26, 1998
  § 102(e) Date: Aug. 26, 1998
(87) PCT Pub. No.: WO98/32042
  PCT Pub. Date: Jul. 23, 1998

(30) Foreign Application Priority Data

Jan. 17, 1997 (JP) ................................................ 9-007021

(51) Int. Cl.$^7$ ....................................................... G02B 6/36
(52) U.S. Cl. ................................. 385/92; 385/14; 385/49; 385/52
(58) Field of Search ................................. 385/14, 49, 52, 385/53, 92

(56) References Cited

U.S. PATENT DOCUMENTS 4,402,568 * 9/1983 Kulich et al. ..................... 350/96.16
5,463,708 * 10/1995 Yui et al. ............................. 385/49

FOREIGN PATENT DOCUMENTS 5-323159 12/1993 (JP) .
7-63956 3/1995 (JP) .
07294777A * 10/1995 (JP) ..................................... 385/92

* cited by examiner

Primary Examiner—Cassandra Spyrou
Assistant Examiner—Craig Curtis
(74) Attorney, Agent, or Firm—Frishauf, Holtz, Goodman, Langer & Chick, P.C.

(57) ABSTRACT

An optical module comprises a substrate (2), formed with wiring patterns for electrical signals and having a mounting surface (2b) mounted with one or more semiconductor optical elements (4), and a package (7, 8) in which the substrate (2) is located. The substrate (2) is formed with at least one first positioning section (2c), the package (7) is formed of a synthetic resin and includes a disposition section (7e) in which one or more optical waveguide components are opposed to the semiconductor optical elements (4), and a second positioning section (7g) adapted to engage the first positioning section, thereby positioning the semiconductor optical elements and the disposition section.

22 Claims, 13 Drawing Sheets

OPTICAL MODULE

TECHNICAL FIELD

The present invention relates to an optical module used for optical communication.

BACKGROUND ART

Conventionally, optical modules for optical communication can be classified into two types, a coaxial pigtail type, which is based on a can type and in which an optical waveguide, e.g., an optical fiber, and a semiconductor optical element are connected optically to each other through a lens, and a receptacle type in which an optical fiber can be attached or detached by means of a connector. Further, pump lasers or laser diode modules of a distribution-feedback type for optical fiber amplifiers include butterfly-type pigtail modules that include a cooler using a Peltier element. In order to obtain high reliability, in this case, the modules of the two types employ a hermetically sealed structure of metal or ceramics. An optical waveguide component, e.g., an optical fiber, receives light from a light emitting element, and is fixed to a module by soldering or YAG-laser welding when the quantity of light projected with the optical fiber being aligned attains a desired value.

On the other hand, optical modules of a new type have been developed in order to meet a demand for the reduction of costs to realize modern optical subscriber systems. An example is disclosed in the Telecommunications Society-Electronics Society Meeting Drafts C-296, 1996, for instance.

This optical module is characterized by being of a plane mounting type such that a dual inline (DIL) is used for a package.

In this optical module, a laser diode (hereinafter referred to as "LD") is mounted highly accurately on a silicon substrate through picture recognition. A short optical waveguide component, such as an optical fiber, is fixed nonaligned by utilizing a V-groove on the side of light emission from the LD of the substrate. This optical module can be easily sealed by means of a resin adhesive agent. An end portion of the optical fiber may be of a detachable type based on a connector interface or of a pigtail type.

However, the aforesaid module has the following problems. In order to couple the optical waveguide component, such as an optical fiber, accurately to an optical element, the V-groove(s) of the silicon substrate must be worked with high accuracy of about 0.5 μm. If the optical fiber is a single fiber, the silicon substrate requires only one V-groove. In the case where a plurality of optical fibers are coupled to a plurality of semiconductor optical elements, however, a plurality of V-grooves must be worked with high accuracy.

Conventionally, a wet-etching method based on a potassium hydroxide solution or the like is used to work V-grooves on silicon substrates.

According to this method, however, the substrates are etched very dispersedly, so that it is hard uniformly to work fine V-grooves. In the case where a plurality of V-grooves are all worked uniformly, in particular, the yield of the resulting substrates is low. Moreover, the optical fibers, e.g., single-mode fibers, are fine, having diameters as small as about 125 μm, so that they cannot be handled with ease when they are positioned in the V-grooves of the silicon substrate. In positioning a plurality of optical fibers, such as tape fibers, in their corresponding V-grooves, in particular, the optical fibers are arranged so disorderly that they cannot be easily fixed to the V-grooves unless force is applied equally to every optical fiber.

The present invention has been contrived in consideration of these circumstances, and its object is to provide optical modules, which can be assembled with ease and of which substrates can be manufactured with good yield, whereby optical waveguide components, such as optical fibers, and semiconductor optical elements are coupled optically.

DISCLOSURE OF THE INVENTION

In order to achieve the above objects, according to the present invention, there is provided an optical module comprising a substrate, formed with wiring patterns for electrical signals and having a mounting surface mounted with one or more semiconductor optical elements, and a package in which the substrate is located, in which the substrate is formed with at least one first positioning section, the package is formed of a synthetic resin and includes a disposition section in which one or more optical waveguide components are opposed to the semiconductor optical elements, and a second positioning section adapted to engage the first positioning section, thereby positioning the semiconductor optical elements and the disposition section.

Preferably, the first positioning section is a V-groove formed in the mounting surface, and the second positioning section is a ridge.

Preferably, moreover, the optical waveguide component is an optical fiber, and the disposition section is a fiber hole.

Preferably, furthermore, the optical fiber is fixed to the fiber hole in a manner such that one end thereof projects toward the semiconductor optical element for 1 to 1,000 μm.

Preferably, the clearance between the fiber hole and the optical fiber at each end thereof ranges from 0.1 to 0.8 μm.

Preferably, moreover, the substrate is formed of silicon, silicon oxide, aluminum oxide, or aluminum nitride.

Preferably, furthermore, the package is composed of first and second sections.

Preferably, the package is a tubular body having the disposition section formed in the front portion thereof and having the rear portion thereof open.

Preferably, moreover, the package includes a ferrule of ceramics or glass partially molded with a synthetic resin.

The synthetic resin that constitutes the package is not limited to any specific material only if it ensures high dimensional accuracy for molding. Usually, for example, it is a resin composition prepared by blending 100 parts by weight of a synthetic resin with 30 to 40 parts by weight of a filler. In the case of a filler-rich type (case of polyphenylene sulfide (PPS)), a resin component used is prepared by blending 100 parts by weight of a synthetic resin with 30 to 300 parts by weight of a filler.

Available synthetic resins for these resin compositions include, for example, polyphenylene sulfide (PPS), liquid crystal plastic (LCP), totally aromatic polyester, polybenzimidazole (PBI), polyether-ether ketone (PEEK), polyether imide (PEI), polyether nitrile (PEN), polyether sulfone (PES), epoxy resins, etc.

The filler may be formed of any of free combinations of the aforesaid synthetic resins and silica, carbon, glass fibers, carbon fibers, aramid fibers, glass beads, etc.

In the optical module according to the present invention, the substrate can be positioned with respect to the package in a manner such that the first positioning section is caused to engage the second positioning section, and the semiconductor optical element and the disposition section, and therefore, the semiconductor optical element and the optical waveguide component, such as an optical fiber, can be positioned with high accuracy.

BEST MODE FOR CARRYING OUT THE INVENTION

Referring first to FIGS. 1 to 13, a first embodiment of an optical module according to the present invention will be described in detail.

As shown in FIGS. 1 to 4, an optical module 1 comprises a substrate 2 and a package 6.

Figure 1:
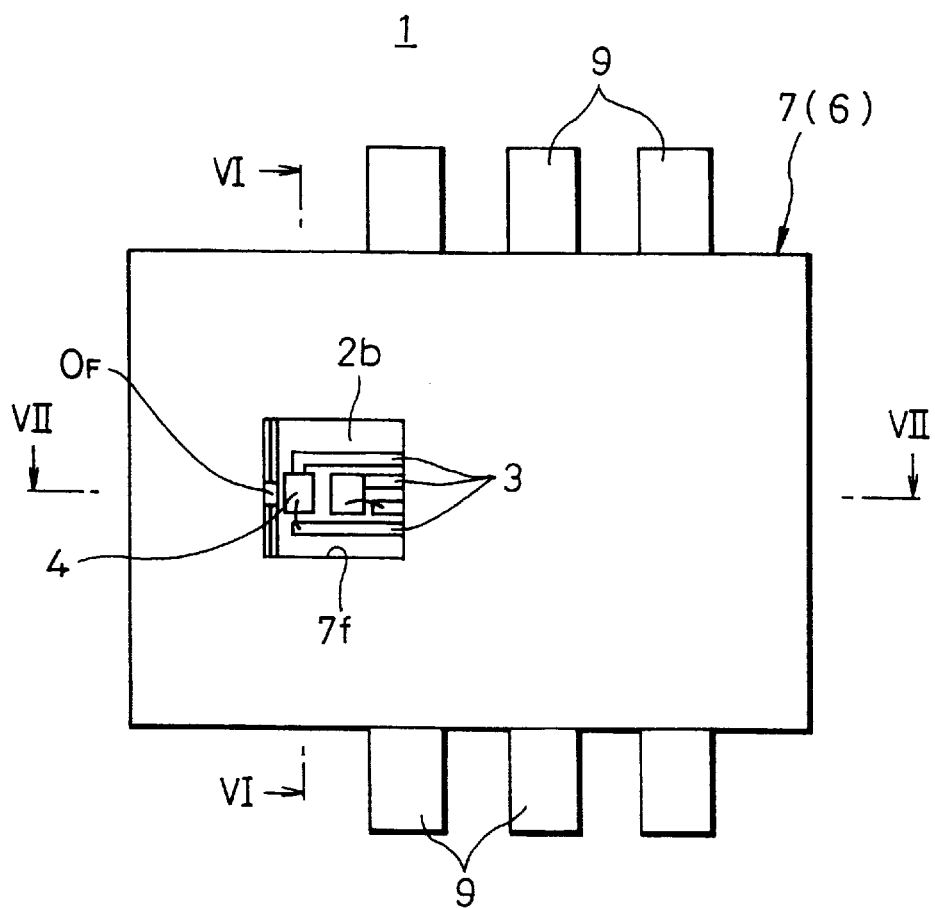
FIG. 1 is a plan view showing a first embodiment of an optical module according to the present invention.
Figure 2:
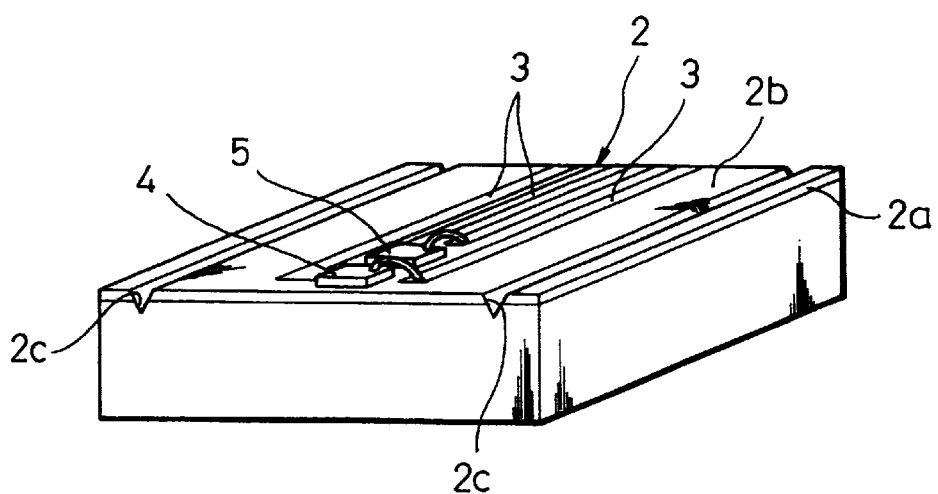
FIG. 2 is a perspective view showing a substrate of the optical module of FIG. 1.

As shown in FIG. 2, the substrate 2 is a member with a length of 3.0 mm, width of 3.5 mm, and thickness of 1.0 mm, for example, in which an insulating layer 2a is formed on the surface of a silicon substrate. A plurality of electric wiring patterns 3 are formed in the center of a mounting surface 2b or the top surface of the substrate 2, and two V-grooves 2c are provided on either side of these wiring patterns 3 in the transverse direction. Further, a semiconductor laser (hereinafter referred to simply as "LD") 4 and an photo diode 5 are mounted on the front portion of the mounting surface 2b of the substrate 2, and are connected to the specific wiring patterns 3, individually. Besides silicon, for example, silicon oxide, aluminum oxide, and aluminum nitride may be used for the substrate 2. When these materials are used, the V-grooves are formed by cutting.

The LD 4 uses the mounting surface 2b as its reference plane, and is mounted on the mounting surface 2b by junction-down so that a light emitting portion (not shown) is situated in a position under and at a given distance from the mounting surface 2b. Further, the photo diode 5 monitors light emitted from the LD 4.

Figure 8:
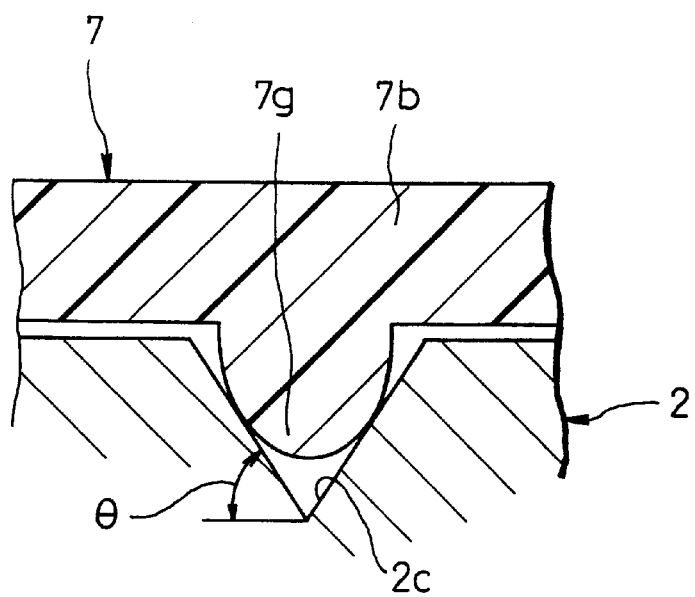
FIG. 8 is a sectional view showing the way a V-groove as a first positioning section of the substrate and a second positioning section of the package engage each other in the optical module of FIG. 1.

The V-grooves 2c, which are etched to a depth of about 150 μm with use of a potassium hydroxide solution, can enjoy satisfactory accuracy in positioning the substrate 2 and a first package 7 in a manner such that they engage ridges 7g (mentioned later) of the first package 7. When the substrate 2 is then etched in the potassium hydroxide solution, with use of a silicon crystal plane (001) as a reference, the V-groove 2c having an angle of inclination θ of 54.7°, called a plane (111), can be formed with good reproducibility, as shown in FIG. 8.

The package 6 is formed of a resin composition that is prepared by blending 100 parts by weight of a synthetic resin, e.g., polyphenylene sulfide (PPS), which ensures high dimensional accuracy for molding, with 100 parts by weight of spherical silica as a filler, and includes the first package 7 and a second package 8.

Figure 3:
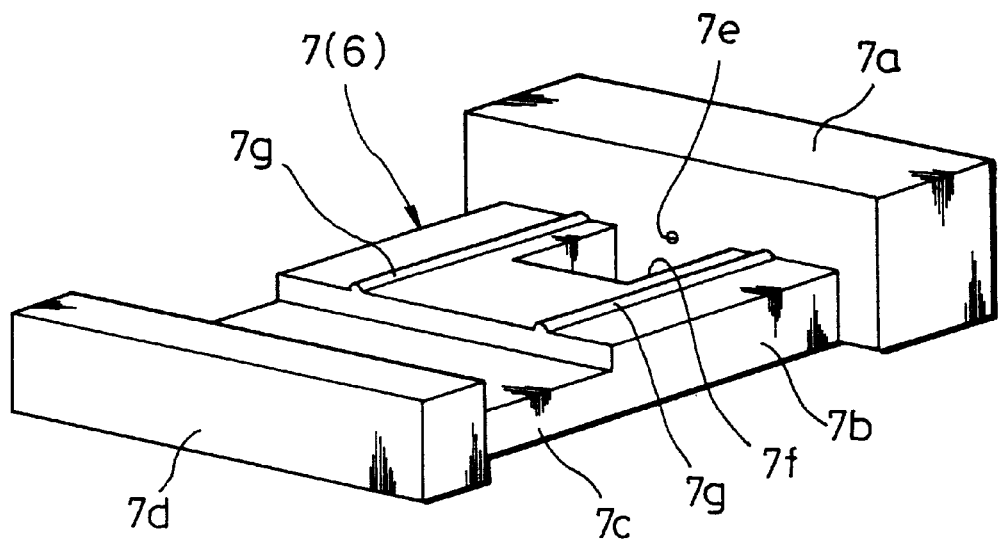
FIG. 3 is a perspective view showing a first package of the optical module of FIG. 1.

The first package 7 is a platelike member that is put on the second package 8 from above so that the substrate 2 is held between the two packages 7 and 8, and is formed integrally with a front edge section 7a, pressure section 7b, rear plate section 7c, and rear edge section 7d, as shown in FIG. 3. For better understanding of the construction, the first package 7 shown in FIG. 3 is illustrated upside down, that is, with its bottom side upward and top side downward. The front edge section 7a is longitudinally penetrated by a fiber hole 7e in the center, through which an optical waveguide component, e.g., an optical fiber, is opposed to the LD 4. The pressure section 7b has an aperture 7f formed in the center of its front portion that adjoins the front edge section 7a. The two ridges 7g are provided on either side of the bottom aperture 7f. As shown in FIG. 8, each ridge 7g engages its corresponding V-groove 2c of the substrate 2, thereby positioning the substrate 2 and the first package 7. Positioning the substrate 2 and the first package 7 requires use of at least one ridge 7g, and the ridges 7g are not limited in number. When the optical module 1 is assembled, therefore, the LD 4 and the optical fiber in the fiber hole 7e can be positioned with high accuracy.

Figure 9:
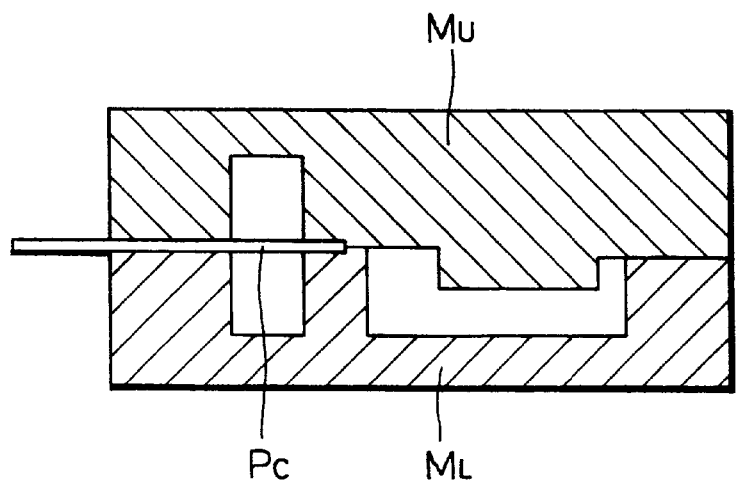
FIG. 9 is a sectional view showing the way the first package is molded by using two molds and a core pin.

The first package 7 is molded so that the fiber hole 7e, which longitudinally penetrates the front edge section 7a, appropriately faces the LD 4 at both ends thereof, especially on the side of the substrate 2. As shown in FIG. 9, the first package 7 is molded by using an upper mold $M_U$ and a lower mold $M_L$. In the molding operation, a core pin $P_c$, which forms the fiber hole 7e, is held at two points. If this is done, the core pin $P_c$ cannot be moved by the pressure of the resin during the molding operation, so that the fiber hole 7e can be formed in the front edge section 7a with high accuracy.

Further, the diameter of the core pin $P_c$ used is set so that the clearance between the fiber hole 7e and the optical fiber therein ranges from 0.1 to 0.8 $\mu$m at both ends of the fiber hole 7e to be formed, and that the distal end of the inserted fiber is restrained from moving excessively. If the optical fiber is a single-mode fiber with a diameter of 125 $\mu$m, for example, the diameter of the core pin $P_c$ is set so that the diameter of the fiber hole 7e to be formed is 126 $\mu$m, which is a little greater than the fiber diameter. In consequence, the first package 7 can restrain the optical fiber in the fiber hole 7e from moving at right angles to the optical axis, thereby accurately positioning the optical fiber and the LD 4, when the optical module is assembled.

Figure 4:
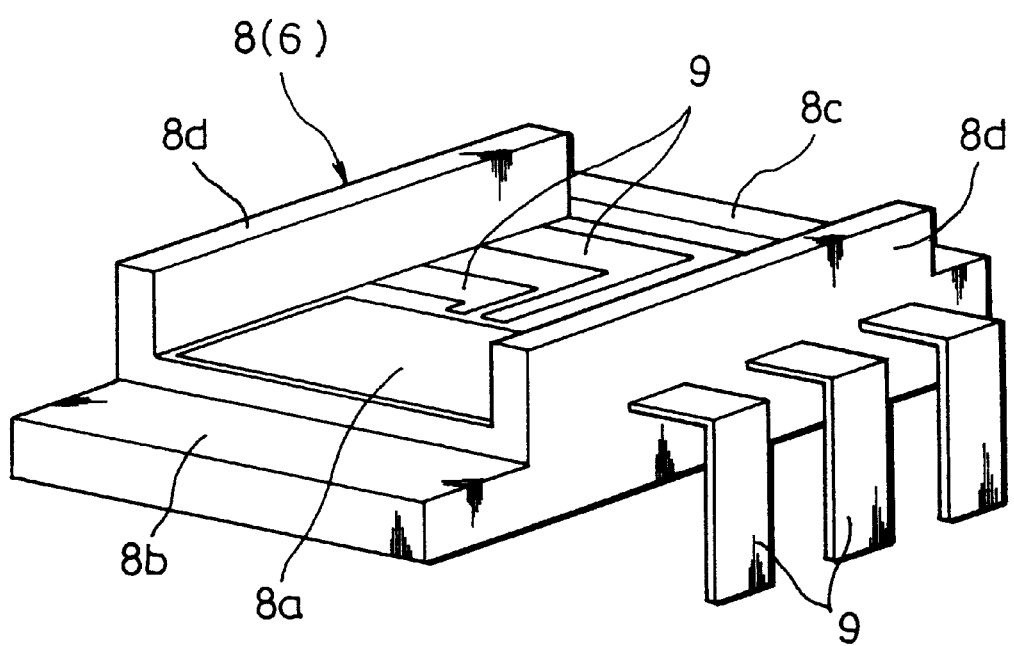
FIG. 4 is a perspective view showing a second package of the optical module of FIG. 1.

As shown in FIG. 4, the second package 8 is a platelike member in which a mounting section 8a formed of an electrically conductive metal and a lead frame formed of a plurality of leads 9 are molded integrally. The mounting section 8a and the leads 9 are exposed on the surface. Each lead 9 extends outward in the transverse direction, and then rises up or hangs down. In the second package 8, moreover, a step section 8b and an engaging wall 8c are formed at its front and rear parts, respectively, and side walls 8d are provided on the transversely opposite sides. The mounting section 8a is molded in a position deviated rearward from the step section 8b as the aforesaid electrically conductive metal is molded.

The optical module 1 having the construction described above is assembled in the following manner.

Figure 5:
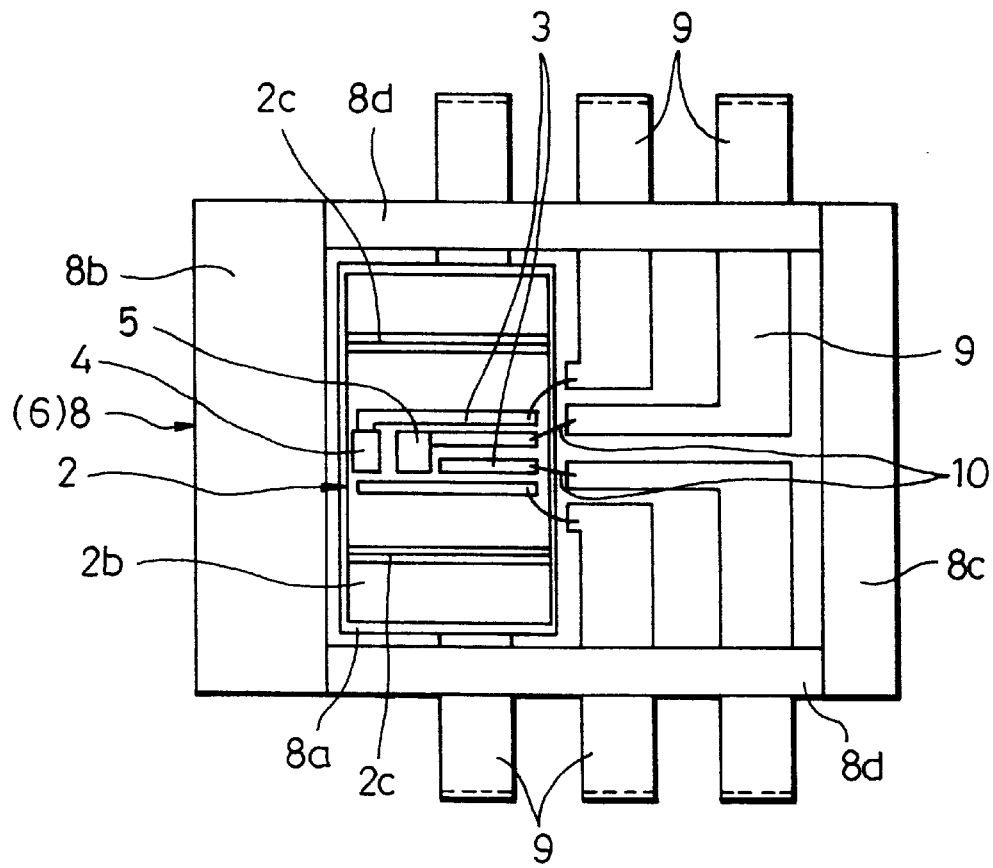
FIG. 5 is a plan view showing the second package of FIG. 4 mounted with the substrate of FIG. 2.

First, as shown in FIG. 5, the substrate 2 shown in FIG. 2 is placed on the mounting section 8a of the second package 8 with its mounting surface 2b upward, and each wiring pattern 3 and its corresponding lead 9 are connected to each other by wire bonding using wiring 10, such as a gold wire. At this time, as shown in FIGS. 5 and 7, the substrate 2 is placed on the mounting section 8a in a manner such that a narrow gap is defined between the substrate 2 and the rear portion of the front edge section 7a of the first package 7.

Figure 6:
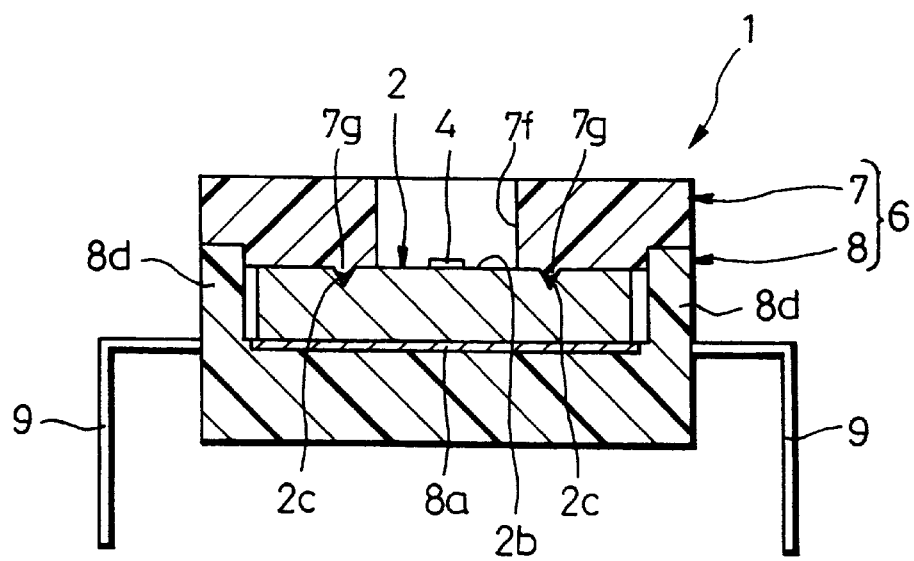
FIG. 6 is a sectional view of the optical module of FIG. 1 taken along line VI—VI.

Then, the front edge section 7a and the rear edge section 7d are located corresponding to the step section 8b and the engaging wall 8c, respectively, and the pressure section 7b and the rear plate section 7c are situated between the two side walls 8d. In this state, the first package 7 is put on the substrate 2 from above so that the ridges 7g engage their corresponding V-grooves 2c of the substrate 2, whereby the substrate 2 is held between the two packages 7 and 8, as shown in FIG. 6.

By this time, the V-grooves 2c are formed on the mounting surface 2b or the top surface of the substrate 2, so that the V-grooves 2c can be watched as the ridges 7g are positioned. Thus, positioning the ridges 7g with respect to the V-grooves 2c is easy. Further, the two packages 7 and 8 are bonded together by means of an adhesive agent, such as a thermosetting epoxy resin, previously applied to predetermined spots thereof.

Figure 7:
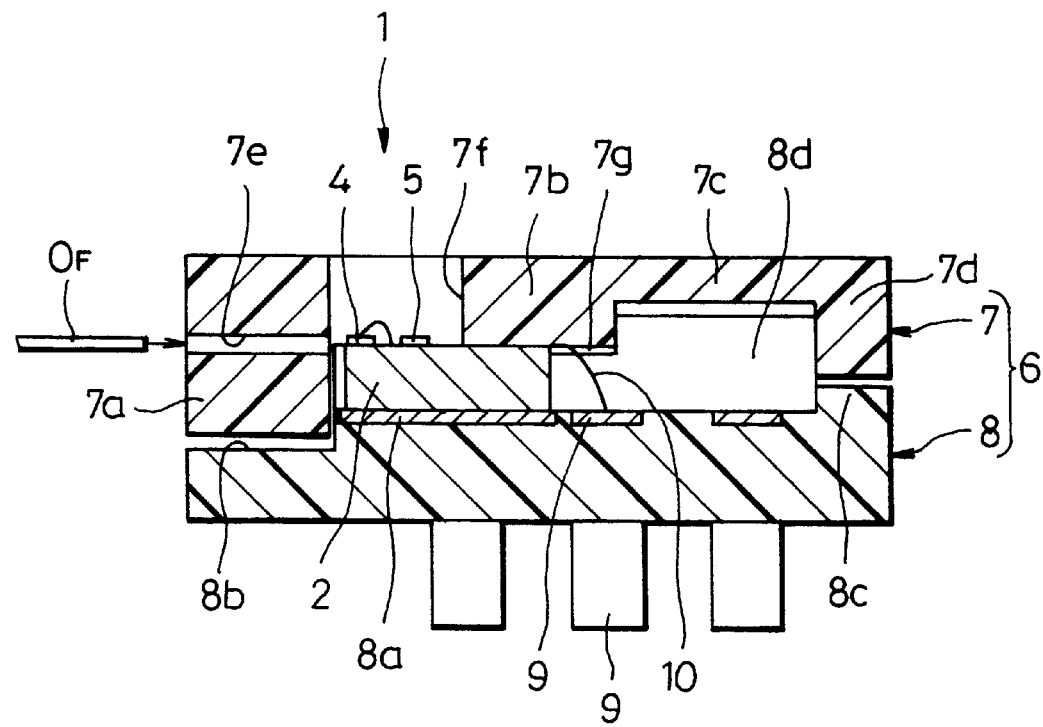
FIG. 7 is a sectional view of the optical module of FIG. 1 taken along line VII—VII.
Figure 10:
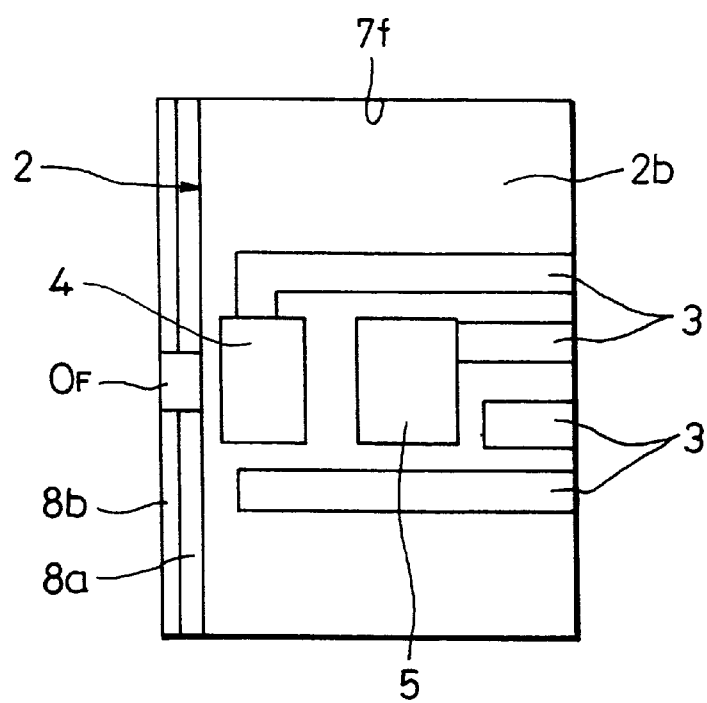
FIG. 10 is an enlarged plan view showing an aperture of the package with an optical fiber as an optical waveguide located in a disposition section.

Subsequently, an optical fiber $O_F$ having a polished end face is inserted into the fiber hole 7e from the outside of the first package 7, as shown in FIG. 7, whereupon it is caused to abut against the front face of the substrate 2. As shown in FIG. 10, therefore, the optical fiber $O_F$ projects from the front edge section 7a of the first package 7 toward the substrate 2 for a distance of 1 to 1,000 mm, which corresponds to the gap between the front edge section 7a and the substrate 2, so that positioning the optical fiber $O_F$ with respect to the LD 4 in the direction of the optical axis is also easy.

Figure 11:
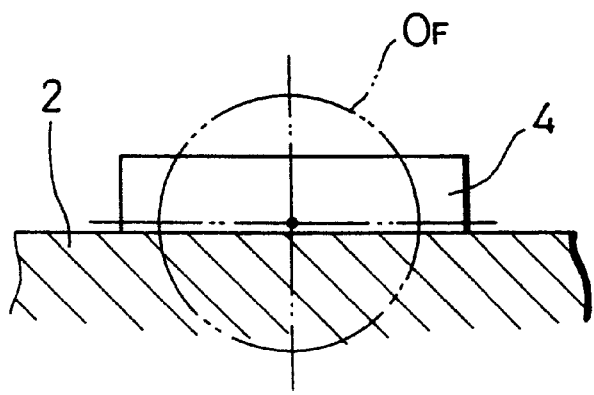
FIG. 11 is a sectional view showing the way the optical fiber as the optical waveguide component and a semiconductor optical element are positioned when the V-groove as the first positioning section of the substrate and the second positioning section of the package are caused to engage each other in the optical module of FIG. 1.

The fiber hole 7e is formed in a manner such that the core pin $P_c$ can be held at two points by means of the upper and lower molds $M_U$ and $M_L$, and that the clearance between the fiber hole 7e and the optical fiber $O_F$ ranges from 0.1 to 0.8 $\mu$m. As shown in FIG. 11, therefore, a center C of the optical fiber $O_F$ and the light emitting portion (not shown) of the LD 4 can be accurately positioned with respect to a direction perpendicular to the optical axis. The outside end portion of the fiber hole 7e may be tapered outward so that the optical fiber $O_F$ can be easily inserted therein.

Thereafter, the optical fiber $O_F$ is fixed to the fiber hole 7e by means of an adhesive agent, such as a thermosetting epoxy resin, and a synthetic resin, such as an epoxy resin stuffed with a silica filler, is loaded through the aperture 7f to protect the LD 4. Thereupon, assembling the optical module 1 of a pigtail type, in which the optical fiber $O_F$ projects from the first package 7, is completed. The aperture 7f is loaded so that the synthetic resin is flush with the top surface of the first package 7, finally.

In the optical module of the present invention, as described above, the substrate 2 and the first package 7 are positioned by means of the V-grooves 2c and the ridges 7g, and the optical fiber $O_F$, an optical waveguide component, is fixed to the fiber hole 7e of the first package 7, not to the V-grooves, by adhesive bonding. Compared to a conventional optical module, therefore, the optical module of the invention can be assembled very easily.

Figure 12:
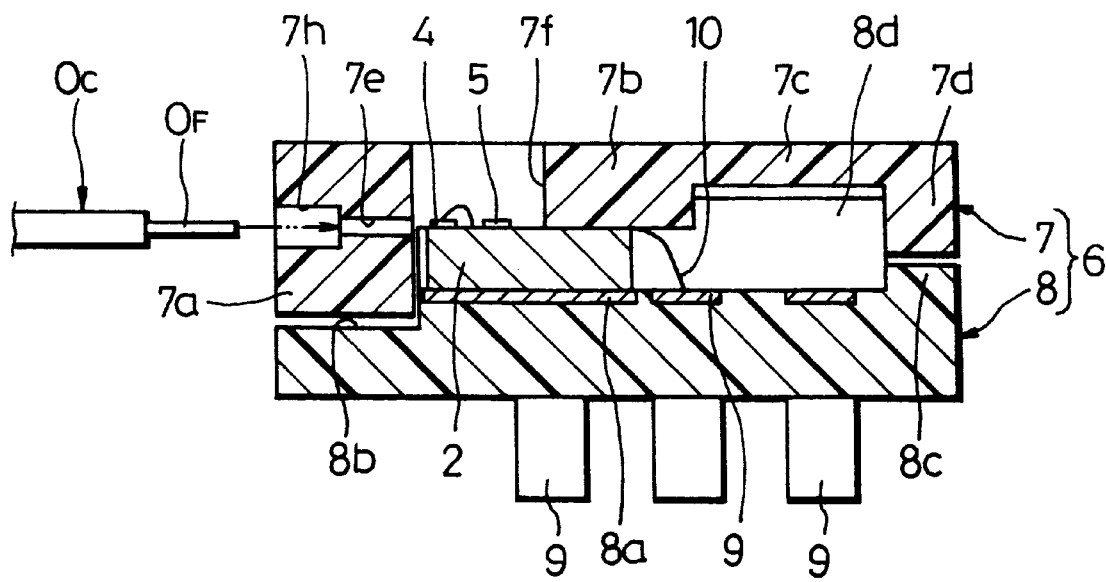
FIG. 12 is a sectional view corresponding to FIG. 7, showing another example of the optical waveguide component located in the disposition section of the package.
Figure 13:
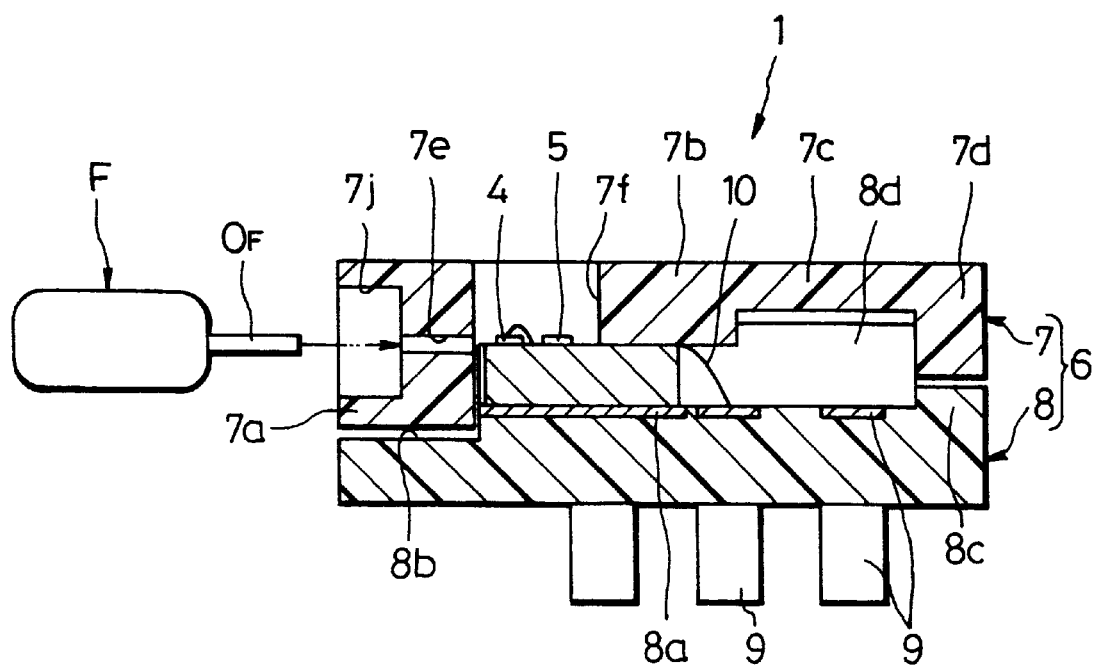
FIG. 13 is a sectional view corresponding to FIG. 7, showing still another example of the optical waveguide component located in the disposition section of the package.
Figure 14:
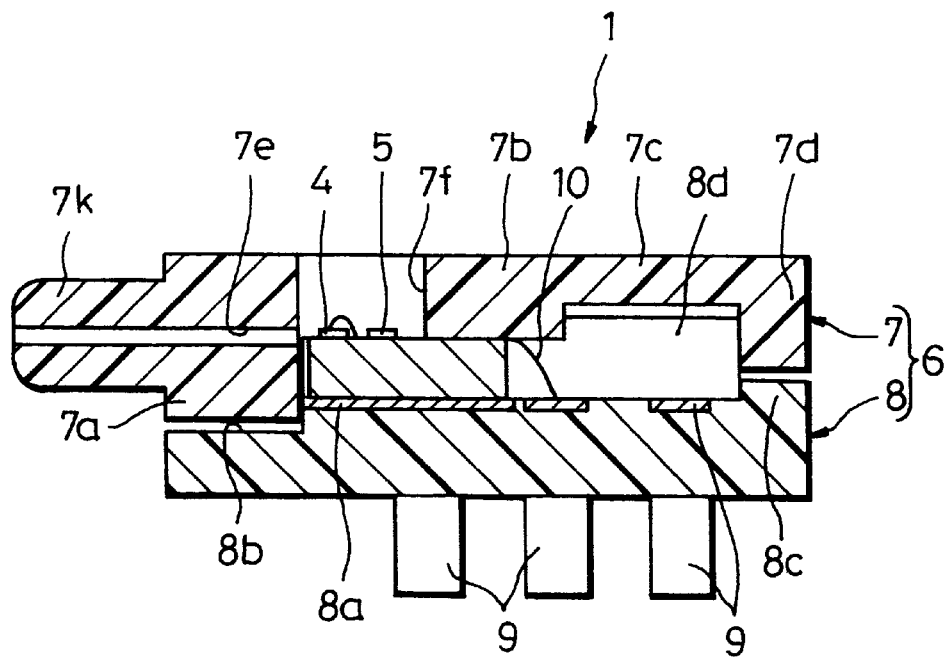
FIG. 14 is a sectional view showing a modification of the first package.
Figure 15:
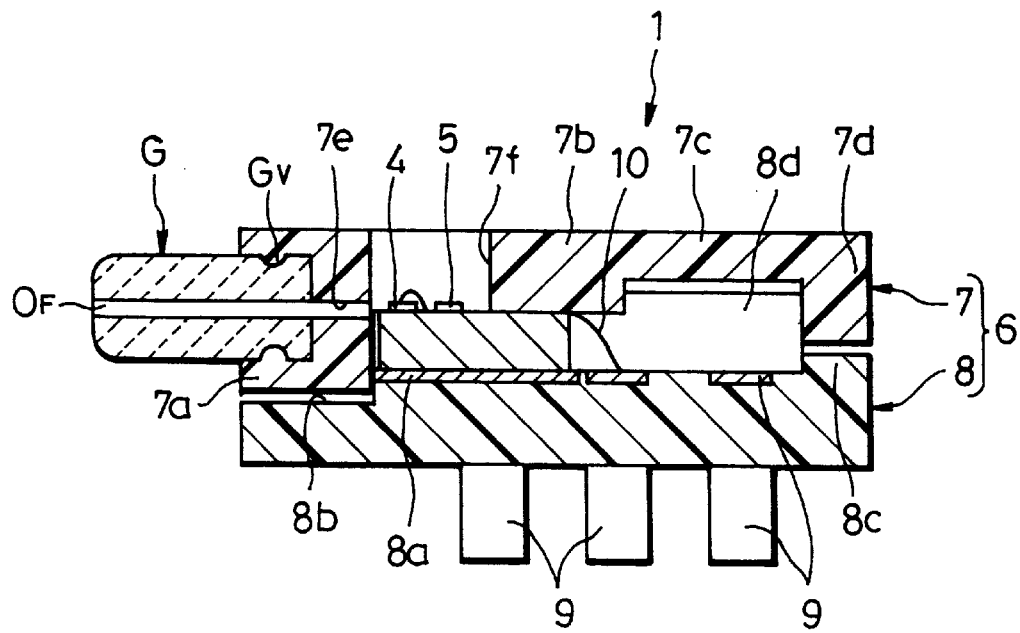
FIG. 15 is a sectional view- showing another modification of the firs package shown in FIG. 13.

The optical module 1 may be made removable by being constructed as a pigtail type using an optical fiber cord $O_C$, as shown in FIG. 12, or by using a ferrule F of a receptacle type, as shown in FIG. 13. As shown in FIG. 14, moreover, the front edge section 7a of the first package 7 may be provided with an integrally molded projection 7k in the form of a ferrule. In the optical module 1, moreover, a ferrule G of ceramics, such as zirconia, or glass may be molded integrally with the front edge portion of the first package 7, as shown in FIG. 15. With the arrangements shown in FIGS. 12 to 15, the optical module 1 can be assembled more easily.

In the case where the optical fiber cord $O_C$ is used, the first package 7 is designed so that the small-diameter fiber hole 7e penetrated by the optical fiber $O_F$ and a large-diameter through hole 7h penetrated by the optical fiber cord $O_C$ are formed on the inside of the front edge section 7a that faces the substrate 2 and on the outside, respectively, as shown in FIG. 12.

In the case where a ferrule F is used, on the other hand, the first package 7 is designed so that its front edge section 7a is formed having the small-diameter fiber hole 7e penetrated by the optical fiber $O_F$, which extends from the ferrule F, and a recess 7j to be fitted with the ferrule F, as shown in FIG. 13.

In the case where the ferrule G is molded on the front edge section of the first package 7, as shown in FIG. 15, moreover, the ferrule G is previously formed with a groove Gv on its rear portion that is to be embedded in the first package 7. With this arrangement, the ferrule G cannot easily slip out of the first package 7.

Figure 16:
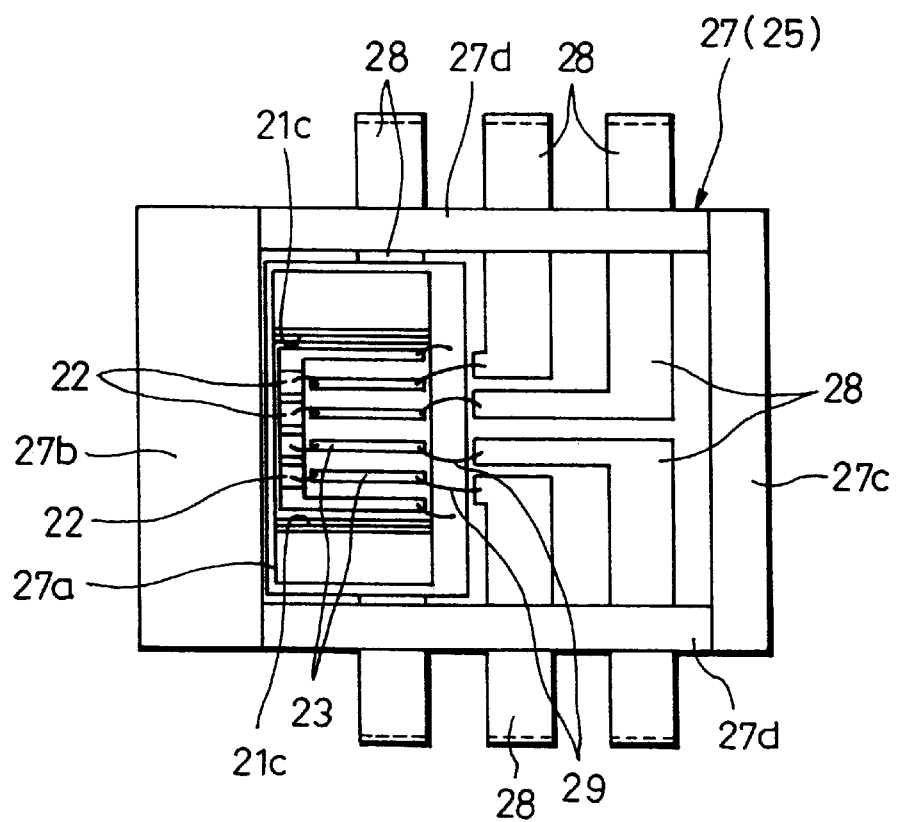
FIG. 16 is a plan view showing a second embodiment of the optical module according to the present invention, in which a substrate is mounted in a second package.
Figure 17:
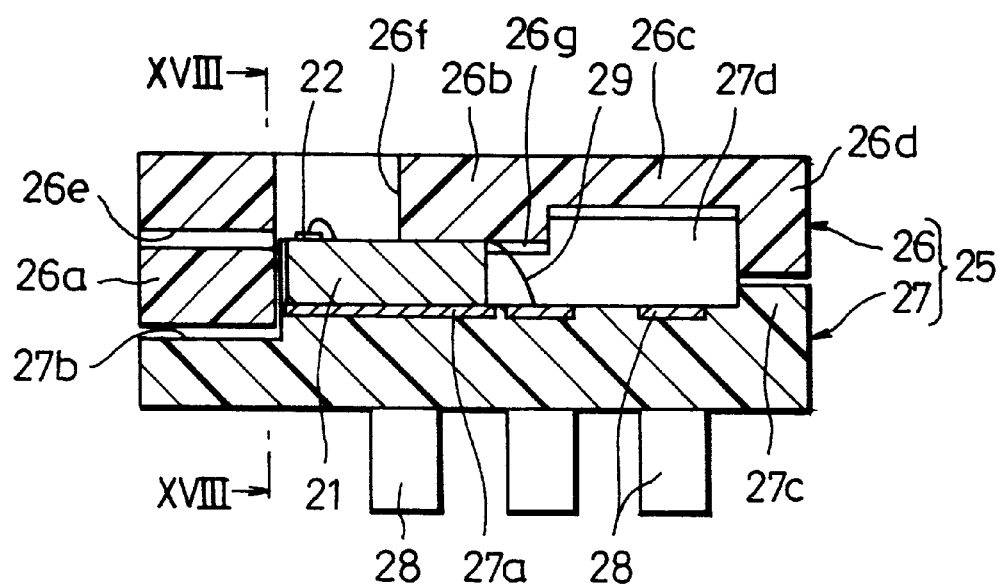
FIG. 17 is a sectional view of the optical module of the second embodiment.
Figure 18:
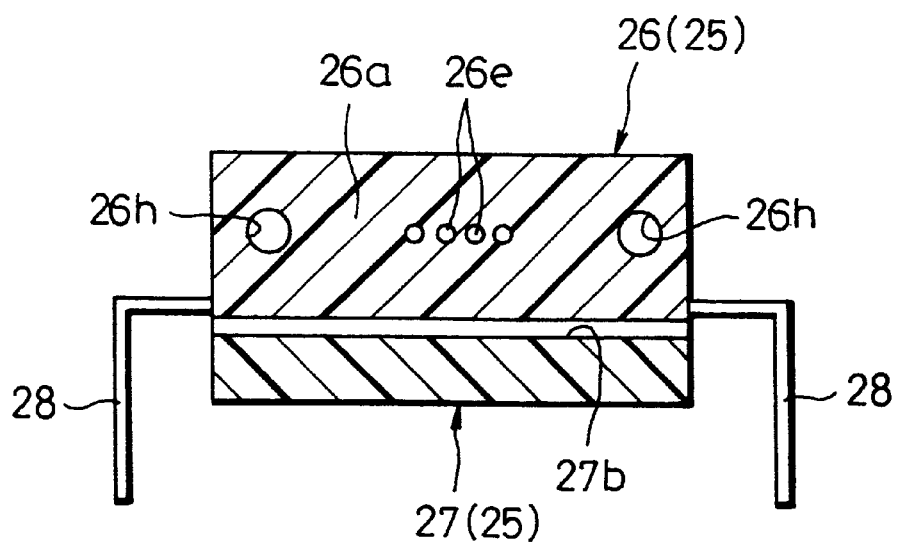
FIG. 18 is a sectional view of the optical module of FIG. 17 taken along line XVI—XVI.

Referring now to FIGS. 16 to 18, an optical module that can be removably attached to a multifiber connector, called an MT connector (IEC61754-5), will be described as a second embodiment of the present invention.

An optical module 20 is provided with a substrate 21 and a package 25, which includes a first package 26 and a second package 27. The package 25 is formed of the same resin composition as the package 6 according to the first embodiment.

In the embodiments described hereinafter, the arrangements of individual members and the steps of procedure for assembling the optical module are the same as in the case of the first embodiment unless otherwise stated. In the description to follow, therefore, corresponding names or numerals are used to designate corresponding components, whereby a detailed description is simplified.

As shown in FIG. 16, four LDs 22 are arranged on a mounting surface 21b or the top surface of the substrate 21 in the transverse direction thereof, and as many wiring patterns 23 as them are formed correspondingly.

As shown in FIG. 18, the first package 26 is formed having four fiber holes 26e and pin holes 26h on either side of the four fiber holes 26e, in its front edge section 26a, and the wiring patterns 23 of the substrate 21 are connected to their corresponding leads 28 by means of wires 29 such as gold wires.

The optical module 20 according to the present embodiment is assembled in the following manner.

First, as shown in FIG. 16, the substrate 21 is placed on a mounting section 27a of the second package 27 with its mounting surface 21b upward, and each wiring pattern 23 and its corresponding lead 28 or the mounting surface 21b are connected to each other by means of the wire 29 such as a gold wire.

Then, the first package 26 is put on the substrate 21 from above so that its ridges 26g engage their corresponding V-grooves 21c of the substrate 21, and the two packages 26 and 27 are bonded together by means of an adhesive agent, such as a thermosetting epoxy resin, with the substrate 21 held between the packages 26 and 27, as shown in FIG. 17.

Subsequently, an optical fiber (not shown) cut to a given length in consideration of the length of the fiber holes 26e and having a polished end face is inserted into each fiber hole 26e, whereupon one end thereof abuts against the front face of the substrate 21 and the other end is exposed on the outer surface of the front edge section 26a.

The optical fiber may be each optical fiber core of a single fiber or a so-called tape fiber composed of a plurality of optical fibers arranged parallel at predetermined intervals. Thus, the optical fiber core, like the one according to the first embodiment, projects from the front edge section 26a of the first package 26 toward the substrate 21 for a distance of 1 to 1,000 µm, which corresponds to the gap between the front edge section 26a and the substrate 21. At this time, each fiber hole 26e, like that of the first package 7, is designed so that the clearance between the fiber hole 26e and the optical fiber ranges from 0.1 to 0.8 µm.

Thereafter, each optical fiber core is fixed to the fiber hole 26e by means of an adhesive agent, such as a thermosetting epoxy resin, and a synthetic resin, such as an epoxy resin stuffed with a silica filler, is loaded through an aperture 26f to protect each LD 22.

Finally, the light emission side of the front edge section 26a is polished together with the optical fiber, whereupon assembling the optical module 20 is completed.

When in service, therefore, the optical module 20 can be easily attached to or removed from the aforesaid MT connector by using guide pins (not shown) that are passed through the pin holes 26h, individually.

The optical module described herein uses the MT connector as the multifiber connector. It is to be understood, however, that the multifiber connector used in the optical module is not limited to the MT connector, and may be a miniature version of the MT connector.

Bumps on the leads may be used as alternative means for connecting the wiring patterns of the substrate and their corresponding leads.

Figure 19:
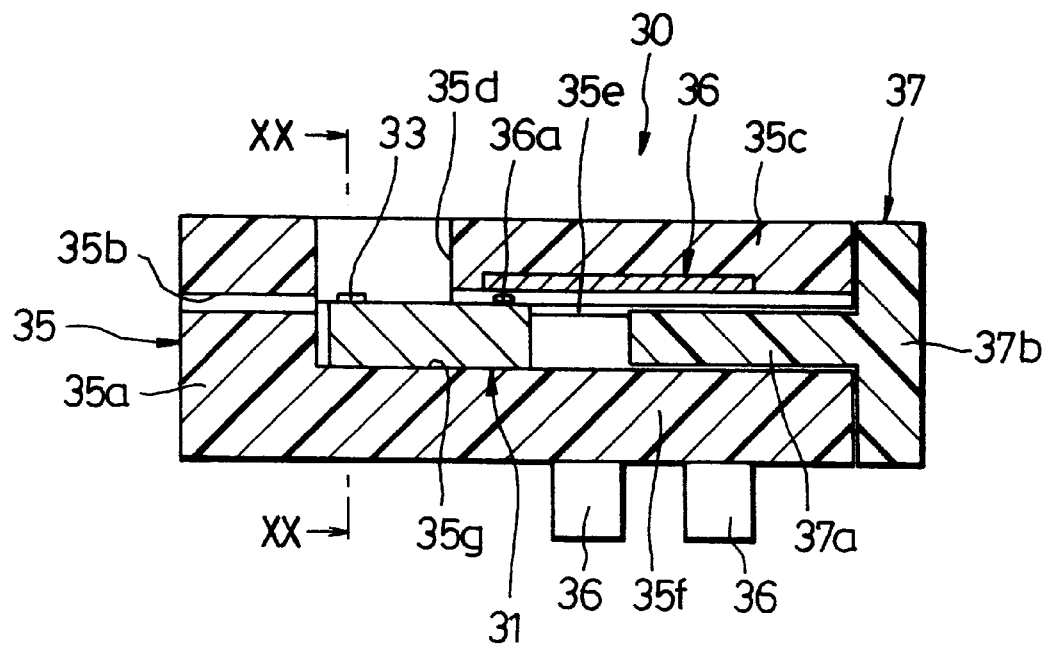
FIG. 19 is a sectional view showing a third embodiment of the optical module according to the present invention.
Figure 20:
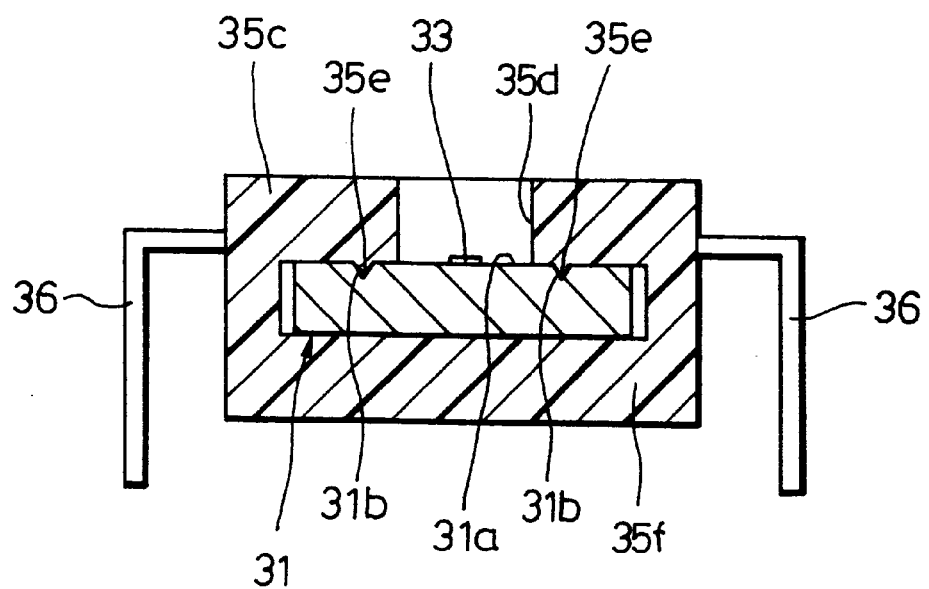
FIG. 20 is a sectional view of the optical module of FIG. 19 taken along line XVIII—XVIII.
Figure 21:
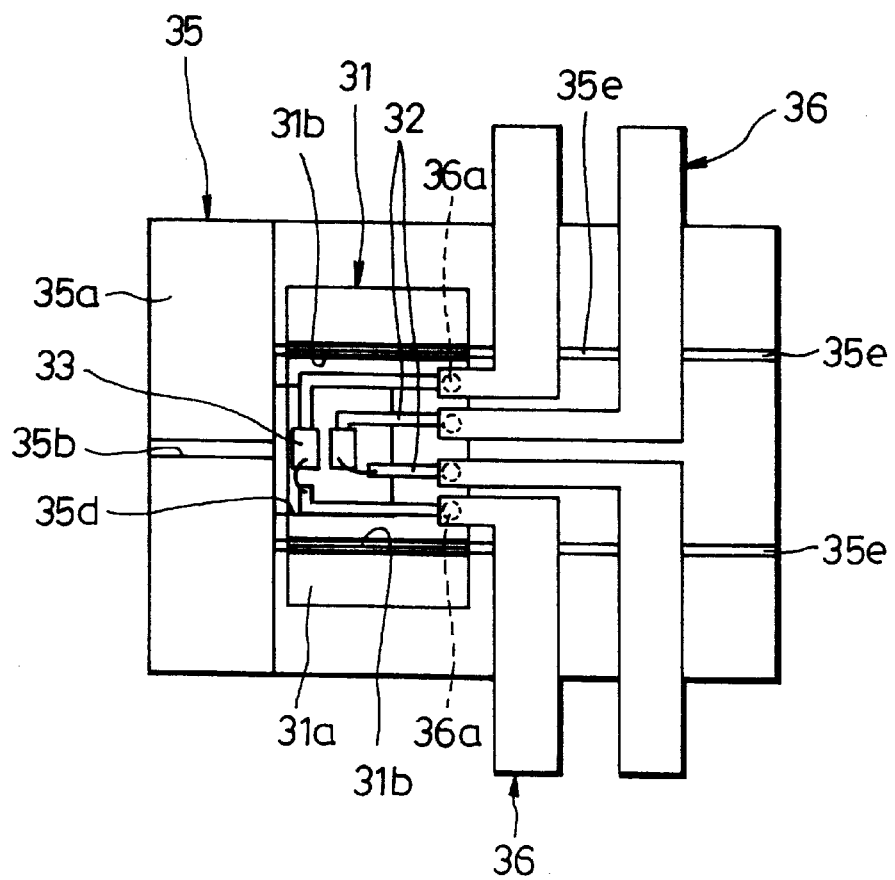
FIG. 21 is an opened-up view of the optical module of FIG. 19 taken from above.
Figure 22:
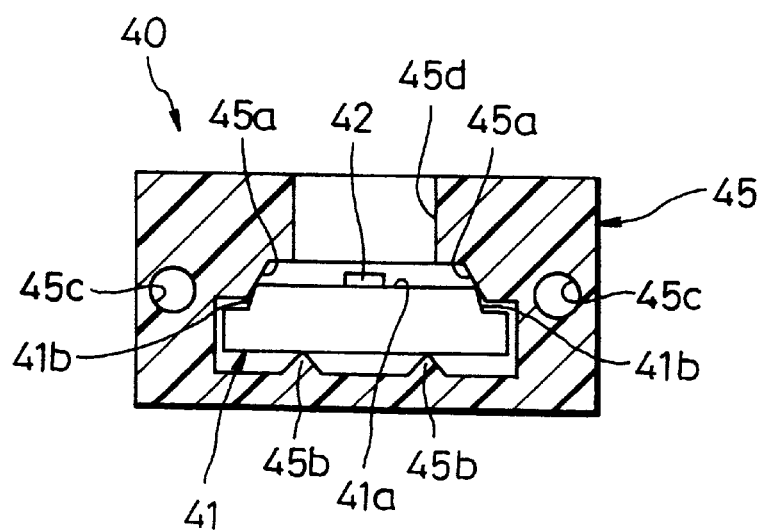
FIG. 22 is a sectional view showing a fourth embodiment of the optical module according to the present invention.

Referring to FIGS. 19 to 21, a third embodiment of the optical module that use these bumps will be described.

An optical module 30 is provided with a substrate 31, package 35, and cap 37. FIG. 21 is an opened-up view of the optical module 30 taken from above.

In the substrate 31, an insulating layer (not shown) is formed on the surface of a silicon substrate. As shown in FIG. 21, a plurality of electric wiring patterns 32 are formed in the center of a mounting surface 31a or the top surface of the substrate 31, and two V-grooves 31b are provided on either side of these wiring patterns 32 in the transverse direction. Further, an LD 33 is mounted on the front portion of the mounting surface 31a of the substrate 31, and is connected to a specific one of the wiring patterns 32.

The package 35 is a member in the form of a square tube having its rear portion open. A fiber hole 35b longitudinally penetrates the near center of a front section 35a, while an aperture 35d is formed in the front portion of a top plate 35c.

The fiber hole 35b, like that of the package according to each of the foregoing embodiments, is designed so that the clearance between the fiber hole 35b and an optical fiber ranges from 0.1 to 0.8 µm. The aperture 35d is formed in a position corresponding to the aperture according to each of the foregoing embodiments, e.g., the aperture 26f of the first package 26. A plurality of leads 36, each having a bump 36a on the front side thereof, are integrally molded on the inner surface of the top plate 35c so that their surfaces are exposed. Ridges 35e, which extend to the rear portion, are formed on either side of the aperture 35d in the transverse direction.

The bump 36a on the front side of each lead 36 is formed in a position corresponding to each wiring pattern 32 on the substrate 31. Further, a recess 35g having a slightly depressed surface is formed in the inside front portion of a bottom plate 35f. The recess 35g is a portion in which the substrate 31 is positioned and the LD 33 is positioned with respect to the fiber hole 35b. The recess 35g is formed in a position such that an optical fiber (not shown) passed through the fiber hole 35b projects inward for 1 to 1,000 µm when the optical fiber abuts against the front face of the substrate 31.

The cap 37 is a member that covers the rear portion of the package 35, and includes an insert section 37a inserted in the package 35 and a lid section 37b covering the rear portion.

The optical module 30 according to the present embodiment, having the construction described above, is assembled in the following manner.

First, the V-grooves 31b are caused to engage the ridges 35e, and the substrate 31 is inserted into the package 35 through the rear portion thereof and positioned by means of the recess 35g. Thereupon, in the package 35, the bumps 36a individually engage the wiring patterns 32 that are formed on the substrate 31, whereby the wiring patterns 32 and their corresponding leads 36 are connected electrically to one another, and the LD 33 is located in a proper position relative to the fiber hole 35b.

Then, the optical fiber (not shown) cut to a given length in consideration of the length of the fiber hole 35b and the aforesaid projection length and having a polished end face is inserted into each fiber hole 35b, whereupon one end thereof abuts against the front face of the substrate 31 and the other end is exposed on the outer surface of the front section 35a. Thus, the optical fiber projects from the front section 35a toward the substrate 31 for 1 to 1,000 μm.

Subsequently, the optical fiber is fixed to the fiber hole 35b by means of an adhesive agent, such as a thermosetting epoxy resin, and a synthetic resin, such as an epoxy resin stuffed with a silica filler, is loaded through the aperture 35d to protect the LD 33.

Thereafter, the cap 37 is inserted into the package 35 through the rear portion thereof, and is bonded to the package 35 by means of an adhesive agent, such as a thermosetting epoxy resin, whereupon assembling the optical module 30 is completed.

Thus, in the optical module 30 of the present embodiment, the wiring patterns 32 of the substrate 31 and their corresponding leads 36 are connected electrically to one another by means of the bumps 36a, so that the assembling operation is easier than in the case where wire bonding is used for the connection.

Referring now to FIGS. 22 to 27, a fourth embodiment of the optical module according to the present invention will be described, in which a cylindrical package can be attached to and removed from the aforesaid MT connector. An optical module 40 according to the present embodiment is characterized in that a substrate is positioned by means of the inner wall of the package.

The optical module 40 is provided with a substrate 41 and a package 45.

Figure 23:
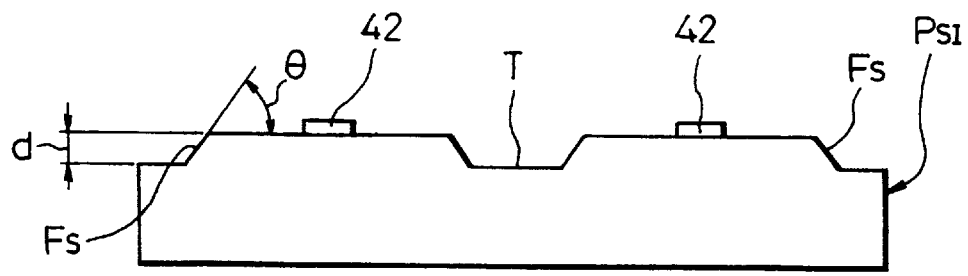
FIG. 23 is a front view showing an example of a method for manufacturing a substrate used in the optical module of FIG. 22.

In the substrate 41, whose basic construction is similar to that of the substrate 31 according to the third embodiment, electric wiring patterns (not shown) are formed on a mounting surface 41a or its top surface, and the front portion of the mounting surface 41a is mounted with an LD 42 that is connected to a predetermined wiring pattern. However, the substrate 41 is formed with positioning slopes 41b on either side in the transverse direction, in place of the V-grooves. As shown in FIG. 23, the substrate 41 is manufactured in a manner such that slopes $F_S$ corresponding to the slopes 41b and a trapezoidal groove T are formed individually on the opposite sides and in the center of a silicon plate $P_{Sl}$, which is equivalent to a double version of the substrate 41 and is mounted with LDs 42, by etching to a depth of d=300 μm with use of a potassium hydroxide solution, and the resulting plate is cut in the center of the trapezoidal groove T. It is to be understood, however, that the substrates 41 can be manufactured individually.

The slopes FS and the trapezoidal groove T can be formed into the slant surfaces of FIG. 23 called planes (111), having the angle of inclination θ of 54.7°, by being etched in the potassium hydroxide solution, with use of the silicon crystal plane (001) as a reference.

The package 45 is constructed substantially in the same manner as the package 35 according to the third embodiment. Slant surfaces 45a that engage the slopes 41b of the substrate 41 are formed individually on the opposite sides of the interior of the package 45, and two inverted-V-shaped ridges 45b are formed on the undersurface. Pin holes 45c are formed individually on the transversely opposite sides.

The package 45 is formed having a portion (not shown) corresponding to the recess 35g according to the third embodiment, which is situated in a predetermined position inside and serves to regulate the position of the substrate 41 to be inserted therein.

Thus, in the optical module 40, the substrate 41 is inserted into the package 45 through its rear portion in a manner such that the slant surfaces 45a and the slopes 41b are caused to engage one another to position the substrate 41 with respect to the package 45. Thereupon, in the package 45, the wiring patterns formed on the substrate 41 and their corresponding leads are connected electrically to one another by means of bumps.

Then, an optical fiber (not shown) having a polished end face is inserted into a fiber hole in a manner such that one end thereof abuts against the front face of the substrate 41 and that the other end is exposed on the outer surface of the front portion of the package 45. Thus, the optical fiber projects toward the substrate 41 for 1 to 1,000 μm.

Subsequently, the optical fiber is fixed to the fiber hole by means of an adhesive agent, such as a thermosetting epoxy resin, and a synthetic resin, such as an epoxy resin stuffed with a silica filler, is loaded through an aperture 45d to protect the LD 42.

Thereafter, a cap is inserted into the package 45 through the rear portion thereof, and is bonded to the package 45 by means of an adhesive agent, such as a thermosetting epoxy resin, whereupon assembling the optical module 40 is completed.

Figure 24:
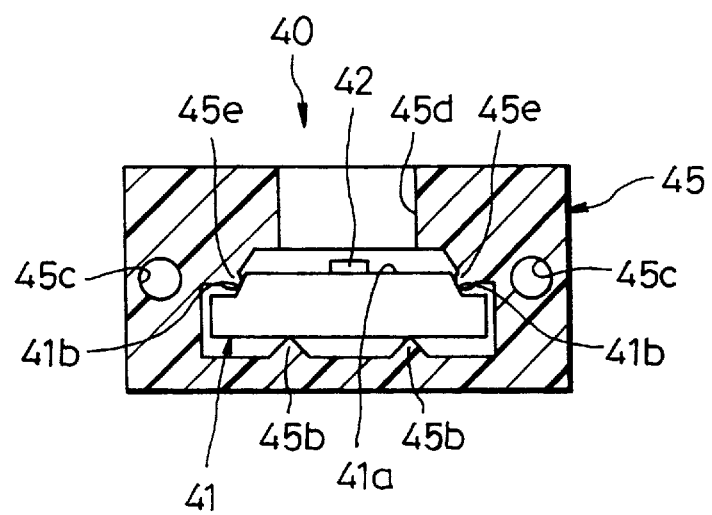
FIG. 24 is a sectional view showing a modification of the optical module of FIG. 22.

In the package 45, as shown in FIG. 24, the substrate 41 can be positioned with use of ridges 45e having a convex sectional surface to engage the slopes 41b of the substrate 41, in place of the slant surfaces 45a.

Figure 25:
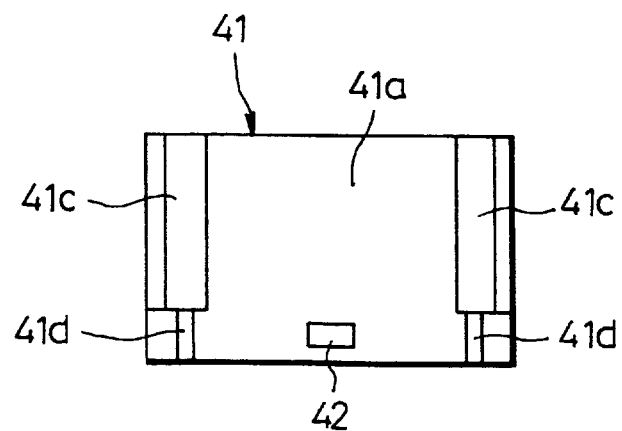
FIG. 25 is a plan view showing a modification of the substrate used in the optical module of FIG. 22.
Figure 26:
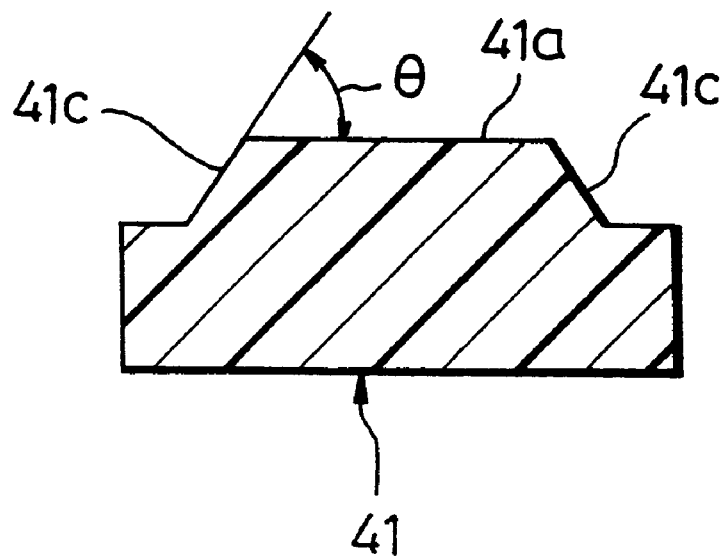
FIG. 26 is a sectional view of the substrate of FIG. 25 cut along first slopes in the transverse direction.
Figure 27:
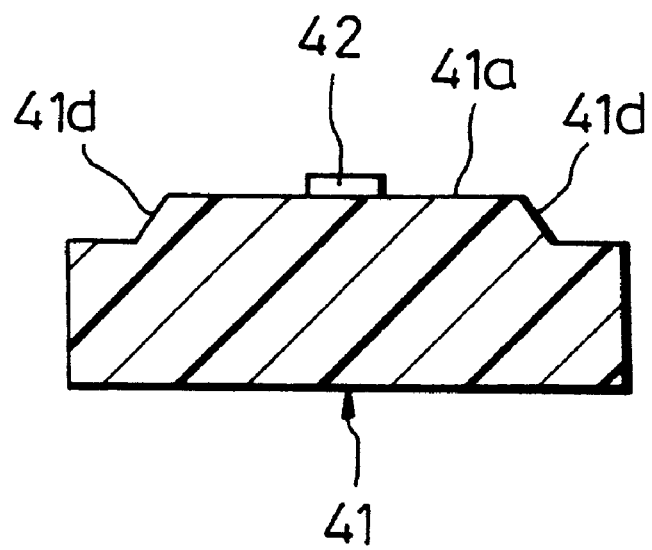
FIG. 27 is a sectional view of the substrate of FIG. 25 cut a along second slopes in the transverse direction.

In the substrate 41, moreover, the slopes formed on the transversely opposite sides may be formed of first slopes 41c and second slopes 41d with the angle of inclination θ maintained, as shown in FIG. 25, so that the substrate 41 can be positioned roughly with respect to the package 45 in the initial stage of insertion and finely in the final stage of insertion. Thus, the first slopes 41c are widened by deep etching, as shown in FIG. 26, while the second slopes 41d are made narrower than the first slopes 41c by shallow etching, as shown in FIG. 27.

INDUSTRIAL APPLICABILITY

According to the present invention, there may be provided optical modules, which can be assembled with ease and of which substrates can be manufactured with good yield, whereby optical waveguide components, such as optical fibers, and semiconductor optical elements are coupled optically.

The semiconductor optical elements and a disposition section are preferably positioned by means of a V-groove and a ridge, so that the substrate can be machined and positioned with ease.

The disposition section is preferably a fiber hole, so that an optical fiber can be suitably used as an optical waveguide component.

The optical fiber is preferably made to project toward the semiconductor optical element, so that positioning the optical fiber and the semiconductor optical element in the direction of the optical axis is easy.

A clearance between the fiber hole and the optical fiber preferably ranges from 0.1 to 0.8 μm, so that the distal end of the inserted fiber can be restrained from moving unduly when the optical fiber is inserted into the package, and the optical module can be assembled with ease.

The material of the substrate can be freely selected as one suited for etching or cutting, so that the material selection enjoys an increased degree of freedom.

The package preferably first and second sections, so that the substrate can be held with ease, and the optical module can be assembled easily.

According to the present invention, the substrate can be easily attached to the package.

And according to the present invention, assembly may be easier.

What is claimed is:

1. An optical module comprising:
   a substrate formed with wiring patterns for electrical signals and having a mounting surface mounted with at least one semiconductor optical element; and
   a package in which the substrate is located;
   wherein said substrate is formed with at least one first positioning section on said mounting surface; and
   wherein said package is formed of a synthetic resin and includes a disposition section in which at least one optical waveguide component is opposed to said semiconductor optical element, and at least one second positioning section adapted to engage said at least one first positioning section of said substrate and thereby position said at least one semiconductor optical element and said disposition section of said package.

2. An optical module according to claim 1, wherein said optical waveguide component comprises an optical fiber, and said disposition section comprises a fiber hole.

3. An optical module according to claim 2, wherein said optical fiber is fixed to said fiber hole in a manner such that one end of said optical fiber projects toward said semiconductor optical element for 1 to 1000 um.

4. An optical module according to claim 3, wherein said optical fiber abuts against a front face of said substrate to thereby position said optical fiber with respect to said at least one semiconductor optical element in a direction of an optical axis of said optical fiber.

5. An optical module according to claim 2, wherein a clearance between said fiber hole and said optical fiber at each end of said optical fiber ranges from 0.1 to 0.8 um.

6. An optical module according to claim 1, wherein said at least one first positioning section comprises a V-groove formed on said mounting surface, and said at least one second positioning section comprises a ridge, and wherein said V-groove and said ridge are engaged to prevent positional shift of said substrate and said package in a direction perpendicular to said V-groove and parallel to said mounting surface.

7. An optical module according to claim 6, wherein said optical waveguide component comprises an optical fiber, and said disposition section comprises a fiber hole.

8. An optical module according to claim 7, wherein said optical fiber is fixed to said fiber hole in a manner such that one end of said optical fiber projects toward said semiconductor optical element for 1 to 1000 um.

9. An optical module according to claim 8, wherein said optical fiber abuts against a front face of said substrate to thereby position said optical fiber with respect to said at least one semiconductor optical element in a direction of an optical axis of said optical fiber.

10. An optical module according to claim 7, wherein a clearance between said fiber hole and said optical fiber at each end of said optical fiber ranges from 0.1 to 0.8 um.

11. An optical module according to claim 1, wherein said package comprises a first package including said disposition section and said at least one second positioning section, and a second package having a mounting section for mounting said substrate and leads extending outward for electrical connection, and wherein said substrate is placed on said mounting section and held between said first and second packages, and said wiring pattern and said leads are electrically connected.

12. An optical module according to claim 11, wherein said optical waveguide component comprises an optical fiber, and said disposition section comprises a fiber hole.

13. An optical module according to claim 12, wherein said optical fiber is fixed to said fiber hole in a manner such that one end of said optical fiber projects toward said semiconductor optical element for 1 to 1000 um.

14. An optical module according to claim 13, wherein said optical fiber abuts against a front face of said substrate to thereby position said optical fiber with respect to said at least one semiconductor optical element in a direction of an optical axis of said optical fiber.

15. An optical module according to claim 12, wherein a clearance between said fiber hole and said optical fiber at each end of said optical fiber ranges from 0.1 to 0.8 um.

16. An optical module according to claim 1, wherein said substrate is formed of one of silicon, silicon oxide, aluminum oxide, and aluminum nitride.

17. An optical module according to claim 1, wherein said substrate is formed of silicon and said waveguide component comprises a single mode optical fiber.

18. An optical module according to claim 1, wherein said package comprises a tubular body having said disposition section formed in a front portion of said tubular body, and wherein a rear portion of said tubular body is open.

19. An optical module according to claim 6, wherein said package comprises a tubular body having said disposition section formed in a front portion of said tubular body, and wherein a rear portion of said tubular body is open.

20. An optical module according to claim 1, wherein said package comprises a ferrule of one of ceramics and glass partially molded with a synthetic resin.

21. An optical module according to claim 6, wherein said package comprises a ferrule of one of ceramics and glass partially molded with a synthetic resin.

22. An optical module according to claim 11, wherein said package comprises a ferrule of one of ceramics and glass partially molded with a synthetic resin.

* * * * *

UNITED STATES PATENT AND TRADEMARK OFFICE
CERTIFICATE OF CORRECTION

PATENT NO.    : 6,270,263 B1
DATED         : August 7, 2001
INVENTOR(S)   : Masayuki Iwase et al.

It is certified that error appears in the above-identified patent and that said Letters Patent is hereby corrected as shown below:

<u>Title page,</u>
Item [45], Date of Patent, insert -- * -- before "Aug. 7, 2001",
Item [*] Notice, above "Subject to any..." insert -- This patent issued on a continued prosecution application filed under 37 CFR 1.53 (d), and is subject to the twenty year patent term provisions of U.S.C 1.54 (a) (2). --;
Item [56], FOREIGN PATENT DOCUMENTS, insert
-- 55-100514    7/1980  (Japan) --; and insert
-- OTHER PUBLICATIONS
Y. Sano et al; Development of an Automatic Manufacturing System for SMT Optical Modules; 1996; page 296; NEC Corp. (article in Japanese & 4 pages of English translation ) --.

Signed and Sealed this

Seventh Day of May, 2002

*Attest:*

JAMES E. ROGAN
*Attesting Officer*    *Director of the United States Patent and Trademark Office*